United States Patent Office

2,893,869
Patented July 7, 1959

2,893,869
BROMINATED SESAME OIL

Karl M. Beck, Lake Bluff, Ill., and Noble Stormont, Plymouth, Mich.; said Beck assignor to Abbott Laboratories, North Chicago, Ill., a corporation of Illinois No Drawing. Application October 18, 1956
Serial No. 616,625

4 Claims. (Cl. 99—28)

This invention relates generally to soft drinks containing weighting oils and more particularly to an improvement stabilizing agent for citrus oil emulsions used in the manufacture of soft drinks and to the soft drinks prepared with said agent.

Brominated vegetable oils, such as brominated olive and apricot kernel oils, are used in the flavor industry as stabilizing agent or "weighting oils" for citrus oil in certain citrus emulsions used in the manufacture of soft drinks. These brominated oils are used in the flavored oil emulsions to stabilize said products to prevent the formation of a ring of oily substance at the top of the soft drink beverage when confined in the usual beverage bottle for an extended period. There is a normal tendency for the citrus oil emulsions in the soft drink beverages to break because of the relatively low specific gravity of the citrus oils compared with that of the aqueous phase. While the brominated olive oil and apricot oils are useful as "weighting oils," it is considered highly desirable to provide an improved stablizing agent for citrus oil emulsions used in the manufacture of soft drinks.

It is, therefore, an object of the present invention to provide an improved weighting oil for citrus oil emulsions.

It is a further object of this invention to provide a citrus oil flavoring soft drink having improved flavor and stability.

Other objects of the present invention will be apparent from the following detailed description and claims to follow.

The foregoing and other objects of the present invention are achieved by using brominated sesame oil as the weighting oil in citrus oil emulsions which are made into bottling syrup and thence into finished soft drinks by combining with water. The brominated sesame oil having a specific gravity about 1.34 at 25° C., is mixed with the desired citrus flavoring oils and the mixture is made into an emulsion containing a suspending agent, such as gum acacia, water, and preferably a preservative, such as propylene glycol or glycerine. The emulsion thus prepared, is made into a bottling syrup by combining with a suitable edible acid, such as citric acid, or other non-toxic acids, and a sweetening agent, such as sugar, and water. The bottling syrup is then made into a finished beverage by combining with water, which is preferably carbonated.

The following specific examples are for the purpose of illustrating the present invention and should not be contended to limit the invention to the precise proportions and materials used.

Example I

An orange oil base emulsion is prepared with the following ingredients:

Mandarin orange oil _____ ½ lb.
Tangerine orange oil _____ 1 lb.
Florida orange oil _____ 3 lbs.
California orange oil _____ 2 lbs.
Concentrated orange oil (five fold) ___ 2 lbs.
Terpeneless orange oil _____ 2 oz. (wt.).
Gum acacia _____ 10 lbs.
Brominated sesame oil _____ Approx. 5–5¼ lbs.

Adjust specific gravity to 1.02–1.03.

The orange oils and the gum are mixed to a uniform mixture and 4 gallons of water are added with agitation to form a uniform emulsion. The emulsion is then passed through a colloid mill or homogenizer to insure a uniform oil dispersion.

The foregoing base emulsion is added to an aqueous solution of the following certified food coloring:

FD and C Yellow #6 _____ 22 oz. (wt.).
FD and C Yellow #5 _____ 5 oz. (wt.).
FD and C Red #1 _____ 9 oz. (wt.).

About 2½ gallons propylene glycol and sufficient water is added to the mixture to make 25 gallons of liquid. The mixture is then passed through a colloid mill or homogenizer to provide a uniform oil dispersion.

The foregoing orange oil emulsion is then combined with a 50% citric acid solution (1½ to 2 oz.) and 1 gallon of sugar syrup (32° Bé.) to form the bottling syrup. The finished beverage is then prepared by adding 4½ fl. oz. of the above solution to a 24 oz. bottle and filling with carbonated water in the conventional manner.

Example II

A lime base emulsion is prepared as in Example I using the following ingredients:

Distilled lime oil _____ 5½ lbs.
Concentrated lime oil (five fold) ___ 1 lb.
Brominated sesame oil _____ Approx. 3.2 lbs.

Adjust specific gravity to 1.01.

The base emulsion is then combined with gum acacia (10 lbs.), glycerine (2½ gals.), and sufficient water to make 25 gallons liquid measure and homogenized to form a uniform oil dispersion.

The lime bottling syrup is then prepared by combining lime emulsions (2 oz.) with a 50% citric acid solution (3 to 3½ oz.) and 1 gallon of sugar syrup (30° Bé.). The finished lime beverage is then prepared by adding 3½ oz. of the said bottling syrup to a 24 oz. beverage bottle and filling with carbonated water.

Example III

A lemon and lime base emulsion is prepared as Example I with the following ingredients:

California lemon oil _____ 4 lbs.
Five fold lemon oil _____ 1 lb.
Oil distilled lime _____ 1½ lbs.
Gum acacia _____ 10 lbs.
Brominated sesame oil _____ Approx. 3.1 lbs.

Adjust specific gravity to 1.01.

The base emulsion is then dissolved in an aqueous solution of the following certified colors:

FD and C Blue #1 _____ ½ oz. (wt.).
FD and C Yellow #5 _____ 20 oz. (wt.).

and mixed with 2½ gallons of glycerine and sufficient water to provide 25 gallons liquid measure. The mixture is stirred thoroughly and passed through a colloid mill or homogenizer to provide a uniform oil dispersion.

The lemon-lime bottling syrup is prepared by combining 2 oz. of the above lemon-lime emulsion with 3 oz. citric acid solution (50%) and 1 gallon of sugar solution (30° Bé.). The lemon and lime finished beverage is prepared by adding 3½ oz. syrup to a 24 oz. bottle and filling with carbonated water.

*Example IV*

The brominated sesame oil in Examples I–III is prepared by placing sesame oil (410 lbs.) in a glass-lined reactor and adding sodium carbonate (30 lbs.). The mixture is cooled with ice brine to a temperature of 20° C., and bromine (270 lbs.) is added with cooling to maintain the temperature below 20° C. After the bromine is added, the mixture is slowly agitated and a vacuum of about 28–30 in. of mercury is applied for an additional period of 1 hour. The mixture is poured into a suitable container and allowed to stand in a warm room for about 16 hours. Thereafter, the clear brominated sesame oil is decanted and filtered at 40° C. The brominated sesame oil thus prepared, has specific gravity of about 1.34 at 25° C., has a bland taste, and has a maximum acid content requiring not more than 1.75 cc., and preferably less than 1.0 cc., of N/10 sodium hydroxide to neutralize 10 gm. of the oil.

The finished soft drink prepared from the brominated sesame oil emulsion in the foregoing matter, provides a citrus oil emulsion having superior suspension properties which results in a more stable emulsion of flavoring oil in the soft drinks, as evidenced by the beverages having a more stable cloud. The brominated sesame oil has superior ability to bring out the true fruit flavor of the citrus flavoring oils and imparts a more natural fruit flavor to the soft drink. Also, the brominated sesame oil provides substantially improved resistance to the development of off tastes in the citrus oil flavored beverages.

Others may readily adapt the invention for use under various conditions of service, by employing one or more of the novel features disclosed or equivalents thereof. As at present advised with respect to the apparent scope of our invention, we desire to claim the following subject matter.

We claim:

1. A weighting oil for citrus oil emulsions used in the manufacture of soft drinks comprising a brominated sesame oil having a specific gravity at 25° C. of about 1.34 and having an acid content which requires a maximum of about 2 cc. of N/10 sodium hydroxide to neutralize 10 grams of the said brominated oil.

2. In a citrus oil base emulsion used in the manufacture of soft drinks, the improved emulsion comprising a citrus oil dispersed in an aqueous medium containing a suspending agent, and a small amount of brominated sesame oil having a specific gravity of about 1.34.

3. A citrus oil base emulsion as in claim 2 wherein the brominated sesame oil is present in an amount sufficient to adjust the specific gravity of the said emulsion to between about 1.01 and 1.03.

4. A citrus oil flavored soft drink comprising a dilute aqueous solution containing a sweetening agent, an edible acid and a citrus oil flavoring emulsion in which a brominated sesame oil having a specific gravity of about 1.34, and said brominated oil being present in the emulsion in an amount sufficient to adjust the specific gravity thereof to between about 1.01 and 1.03.

References Cited in the file of this patent

UNITED STATES PATENTS

| | | |
|---|---|---|
| 1,500,670 | Groote | July 8, 1924 |
| 2,014,045 | Hermann | Sept. 10, 1935 |
| 2,272,484 | Shelton | Feb. 10, 1942 |
| 2,809,895 | Swisher | Oct. 15, 1957 |